(12) United States Patent
Reuter

(10) Patent No.: US 12,286,283 B2
(45) Date of Patent: Apr. 29, 2025

(54) SANITARY TRI-CLAMP CAP WITH INTEGRATED TELESCOPING SLIDE HAMMER

(71) Applicant: Sanitary Processing Products LLC, Mount Horeb, WI (US)

(72) Inventor: Timothy D. Reuter, Mount Horeb, WI (US)

(*) Notice: Subject to any disclaimer, the term of this patent is extended or adjusted under 35 U.S.C. 154(b) by 90 days.

(21) Appl. No.: 18/125,786

(22) Filed: Mar. 24, 2023

(65) Prior Publication Data
US 2023/0303296 A1 Sep. 28, 2023

Related U.S. Application Data

(60) Provisional application No. 63/323,595, filed on Mar. 25, 2022.

(51) Int. Cl.
*B65D 43/26* (2006.01)
*A61J 1/20* (2006.01)
(Continued)

(52) U.S. Cl.
CPC .......... *B65D 51/243* (2013.01); *A61J 1/2079* (2015.05); *B01D 29/35* (2013.01); *B01D 29/96* (2013.01); *B25D 1/16* (2013.01); *B65D 45/00* (2013.01); *B65D 45/32* (2013.01); *B65D 53/02* (2013.01); *B01D 2201/304* (2013.01); *B01D 2201/325* (2013.01); *B01D 2201/347* (2013.01);
(Continued)

(58) Field of Classification Search
CPC ........ Y10T 29/53843; B65D 2250/171; B65D 1/16; B65D 2543/00851; B65D 2543/00824; B65D 51/243; B65D 43/26; B65D 2501/24547; B25D 2250/171
See application file for complete search history.

(56) References Cited

U.S. PATENT DOCUMENTS 5,806,453 A * 9/1998 Cook ...................... B63B 21/24
114/230.1

FOREIGN PATENT DOCUMENTS

DE 3630001 A1 * 4/1987
WO WO-9412321 A1 * 6/1994 ............... B25D 1/16

OTHER PUBLICATIONS

Unibloc Hygienic Technologies, Food Processsing Strainers & Filtration—Largest Selection in Industry, Sep. 15, 2020, YouTube, 3 pages, 0:22, 0:35, & 0:45 / 0:59, https://www.youtube.com/watch?v=6HPv5FdzCkl (Year: 2020).*

(Continued)

*Primary Examiner* — Allan D Stevens
(74) *Attorney, Agent, or Firm* — Stiennon & Stiennon

(57) ABSTRACT

A removable closure assembly has a cap making a liquid-tight seal with a tri-clamp assembly to the open end of a filter assembly body. The closure assembly has a filter which fits within the filter body. To aid in separating the closure assembly from the body, the cap has an outwardly extending shaft fixed thereto. The shaft is terminated by a radially protruding stop block. A handle is slidable on the shaft and functions as a slide hammer weight with an end wall facing the cap through which the shaft extends. The handle is movable to strike the shaft stop block and apply a force to the stop block and shaft for separating the cap from the body. The stop block has axial channels allowing a clean out of place system to exchange cleaning fluid with an interior volume of the handle.

19 Claims, 3 Drawing Sheets

(51) Int. Cl.

| | | |
|---|---|---|
| | *B01D 29/35* | (2006.01) |
| | *B01D 29/96* | (2006.01) |
| | *B25D 1/16* | (2006.01) |
| | *B65D 45/00* | (2006.01) |
| | *B65D 45/32* | (2006.01) |
| | *B65D 51/24* | (2006.01) |
| | *B65D 53/02* | (2006.01) |

(52) U.S. Cl.
CPC .... *B01D 2201/40* (2013.01); *B65D 2251/205* (2013.01); *B65D 2543/00851* (2013.01)

(56) References Cited

OTHER PUBLICATIONS

"Strainers", Sani-Matic, downloaded Mar. 10, 2023. https://sanimatic.com/strainers/.

"Hygenitec Y-strainers," Unibloc Hygienic Technologies US LLC, Downloaded Mar. 10, 2023, https://unibloctech.com/product/hygenitec-y-strainers/.

"SaniClean Strainers by Newark Wire Cloth," SaniClean Strainers, downloaded Mar. 10, 2023, https://www.sanicleanstrainers.com/.

"Tri Clamp Information and Sizing Guide", Triclamp.co, downloaded Mar. 10, 2023, https://triclamp.co/pages/tri-clamp-information-and-sizing-guide.

"Hygienic Components for the Bio-Pharm Industry", Sani-Matic Catalog, downloaded Mar. 10, 2023, https://resources.sanimatic.com/view/544182462/.

"OMT Slide Hammer, 9-Way Internal/External Slide Hammer Puller Set—Pulls Hubs, Rear Wheel Axle Shafts, Bearings, Bushings, Seals, Retainers", Amazon.com, downloaded Mar. 10, 2023, https://www.amazon.com/OrionMotorTech-Hammer-Puller-Bearing-Remover/dp/B07BNLVK12/ref=sxin_17?asc_contentid=amzn1.osa.ed10ea38-aa59-4bb4-a2f1-b7cdf9df760b.ATVPDKIKX0DER.en_US&asc_contenttype=article&ascsubtag=amznLosa.ed10ea38-aa59-4bb4-a2f1-b7cdf9df760b.ATVPDKIKX0DER.en_US&content-id=amzn1.sym.2501e731-e00e-46aa-97f8-28a8de3ef511%3Aamznl.sym.2501e731-e00e-46aa-97f8-28a8de3ef511&creativeASIN=B07BNLVK12&cv-ct-cx=Slide+Hammer&cv-ct-id=amznLosa.ed10ea38-aas9-4bb4-a2fl-b7cdf9df760b.ATVPDKIKX0DER.en_US&cv_ct_pg=search&cv_ct_we=asin&cv_ct_wn=osp-single-source-pecos-desktop&keywords=Slide+Hammer&linkCode=oas&pd_rd_i=B07BNLVK12&pd_rd_r=ef6d495d-dcfl-4132-b912-92605d4e99ea&pd_rd_w=osF8u&pd_rd_wg=IBtYW&pf_rd_p=2501e731-e00e-46aa-97f8-28a8de3ef511&pf_rd_r=G829QTRGQRHQXJKHWMTS&qid=1678450208&sbo=RZvfv%2F%2FHxDF&2BO5021pAnSA3D%3D&sr=1-2-c26ac7f6-b43f-4741-a772-.

* cited by examiner

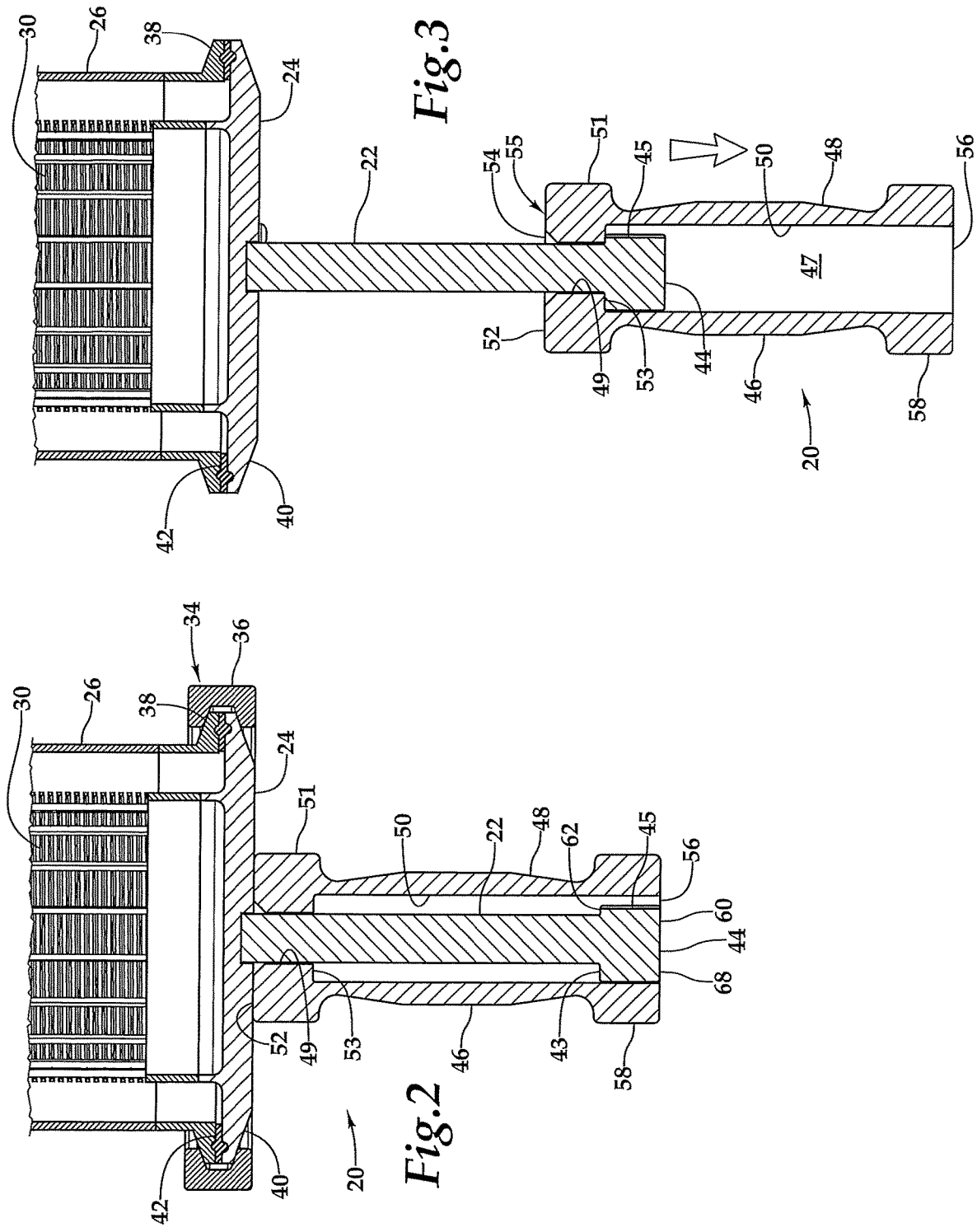

SANITARY TRI-CLAMP CAP WITH INTEGRATED TELESCOPING SLIDE HAMMER

CROSS REFERENCES TO RELATED APPLICATIONS

This application claims the benefit of priority of U.S. App. No. 63/323,595, filed Mar. 25, 2022, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present disclosure relates to the field of sanitary tri-clamp (also known as TRI-CLOVER®) connections. The present inventions more specifically relate to the field of sanitary strainers and sanitary tri-clamp caps for use in food, beverage, cosmetic, and pharmaceutical industries.

Sanitary tri-clamp fittings are the most common types of process tubing/piping connections in the food, beverage, cosmetic, and pharmaceutical processing industries. A Tri-Clamp sanitary connection typically consists of two Tri-Clamp ferrules or flanges, a Tri-Clamp gasket, and Tri-Clamp to mechanically hold the connection together. This style of fitting is preferred in the hygienic/sanitary processing industries specifically due to a couple of reasons. One, they are extremely easy to clean and two, they are relatively easy to assemble and disassemble which is common practice for a processor to inspect or clean process tubing/piping. A sanitary tri-clamp cap can be used in a variety of design applications, for example in an inspection port for cleaning or an access port for insertion or connecting another device.

Sanitary strainers are used in the food, beverage, cosmetics and pharmaceutical industries to remove physical contaminants from process streams to protect other processing equipment such as homogenizers, meters, spray nozzles, needle valves, heat exchangers, and pumps. Sanitary strainers are used to promote sanitation, optimize manufacturing and particle separations, and are cost effective for improved product quality and ensuring uniformity. Further, cleaning solutions recirculated through processing equipment commonly employ strainers to prevent the recirculation of physical contaminants into the processing equipment.

Examples of types of products for which sanitary strainers are used include, for example: ice cream, jellies, bakeries, cosmetics, icing, mustard, toothpaste, ketchup, cheese, mayonnaise, butter, yogurt, salad dressing, milk, soups, chocolate, and cleaning in place (CIP) solutions. While specific examples are provided one of skill in the art will appreciate that sanitary strainers may apply to other products and industries not expressly mentioned. There are multiple types of strainers used for straining products. For example, there are Y(wye)-strainers, where the strainer body inlet and outlet are in-line with the process piping. There are L-strainers or angle-line strainers where the body inlet and outlet are perpendicular to each other. There are T (tee)-strainers where the strainer body is a standard sanitary tee that is in-line with the process line. All of these types of strainers contain removable strainer insert elements that separate solids from liquids. The removable strainer insert assemblies use sanitary a tri-clamp cap connection to assemble the insert to the strainer body.

For example, for coarse straining, a perforated strainer insert element is usually perforated with 3/32", 1/8" and 1/4" diameter holes. For finer straining, a perforated strainer insert element with wire mesh overlay ranging from 0.075" to 0.003" opening may be used.

Alternatively, a wedge-wire strainer insert element ranging from 0.075" to 0.002" opening may be used. A perforated strainer insert element with filter socks ranging from 0.020" to 0.0016" opening may also be used.

Slide hammer technology is a tool that attaches to an object needing to be pulled and transmits an impact force to the object without striking the object itself. A slide hammer tool consists of a long metal shaft and a heavy weight handle. The shaft is threaded on one end to allow it to be attached and removed from the objects it is used to dislodge. The opposite end of the shaft has a slide stop. The heavy weight handle is bored out to allow it to slide freely on the shaft. To use a slide hammer, an operator would insert the shaft through the heavy weight handle and then attach the threaded end to the object it is going to pull. Once attached, the operator would slam the heavy weight handle into the slide stop thus pulling the object. The impact point is between the outside surface of the heavy weight handle and the shaft slide stop.

Sanitary design standards are employed in certain fields. All food, beverage and pharmaceutical processing companies are required to have hygienic processes when producing products that must meet the U.S. Food and Drug Administration (FDA) and other regulatory requirements. For example, the FDA Food Safety Modernization Act defines rules/laws related to food safety for all FDA regulated manufacturers, which includes a risk assessment to eliminate or mitigate the risk of physical hazards. The industries have also evolved to create their own sanitary design standards associations that focus on proven best practices to create processing equipment designs that are cleanable.

In the noted industries, there are two types of cleaning: the first of which is COP (Clean Out of Place); and the second of which is CIP (Clean-in-place). For example, when a strainer meets the requirements of the industry hygienic or sanitary equipment standards, it implies that if the product is used as designed by the Original Equipment Manufacturer (OEM), the product can be CIP. If a product is classified as COP, that means the product must be disassembled from the production line and manually handled and cleaned—which adds cost to handle the product and risk of damaging the product along with the risk of manual cleaning which allows human error and could lead to a product recall or product scrap.

When applying the industry hygienic design standards to the types of sanitary strainers listed previously, only the course straining perforated element is considered to meet industry hygienic design standards, which means it could be CIP. In comparison, the wedge-wire and mesh overlays are not considered sanitary due to cracks and crevices that are created/required during the manufacturing process and must be COP. The filter socks are disposable.

Regardless of CIP or COP applications, all of the strainer insert elements are required to be removed to comply with the food safety sanitization standards. The purpose of removing the strainer insert element is to allow for the following: Clean Out of Place, visual inspection for damage, or to be adenosine triphosphate (ATP) swabbed to verify sanitation.

The Y-Strainer, T-Strainer and L-Strainer/Angle-line strainer use a static handle for removal of the strainer insert element shown in FIG. 13. To remove the strainer insert element, an operator would remove the sanitary clamp and then grasp the static handle by hand and physically pull on the insert handle until the tri-clamp connection seal was disconnected allowing the insert to be removed from the housing.

All three strainer designs have properties that can make removal of the strainer insert element difficult. The sanitary ferrule tri-clamp connection inherently creates a tight seal that requires substantial force to break the seal from the gasket of the body and the strainer insert.

A seal between the strainer insert element and the strainer body is required to meet the function of the strainer to provide a fluid path that passes through the strainer insert element. There are a couple of methods to provide a dynamic seal between a strainer body and a strainer insert element. One method is a close tolerance fit of the strainer insert element to the body, with a tolerance of approximately 0.010". Another method is to use a dynamic O-ring seal where the seal itself slides on the internal body wall surface during insertion and removal. Both methods are used in the industry. The concentricity from this close tolerance fit or the dynamic O-ring and the ferrule clamp connection can and does provide misalignment. The variance in straightness with the male insert connection and the female body connection further pushes the close fit design to an interference design. The strainer applications will experience temperature variations which in turn provide thermal expansion and contraction on the strainer parts. This thermal expansion and contraction with the tight tolerance of the various parts causes binding between the strainer insert element and the strainer body which increases the required force to remove the strainer insert element by hand. Oftentimes, operators will be forced to use hand tools to remove the insert elements. One method used would be to use a flat head screwdriver to provide leverage, with increased force, to pry the sanitary ferrule from the body and the insert. Using a sharp object like a screwdriver can scrape the ferrule surfaces and create a harder to clean surface while also damaging the clamp gasket. Another method is to use a hammer, or other tool, to strike the handle or ferrule connection to get it to move. This method can cause damage to the sanitary ferrule which then could potentially cause the connection to leak or to be unsanitary. It could also cause damage to the handle of the insert element as the handles are not designed for side force loading. All methods of providing additional mechanical force to remove the strainer insert element require the operator to carry hand tools or to retrieve hand tools which adds cost to operations.

A sanitary tri-clamp cap can be used in a wide variety of design applications requiring Clean Out of Place (COP) or Clean In Place (CIP). A few examples of applications that require removal of the sanitary tri-clamp cap are: Clean Out of Place, visual inspection of a vessel or tubing, allowing for ATP swabbing to verify sanitation, cleaning out a port to discard product, or attachment of a mechanical piece of equipment. Sanitary tri-clamp caps do not have handles on them for removal. To remove a sanitary tri-clamp cap, an operator would remove the sanitary clamp and use his or her fingers to pry the edge of the cap away from the seal and ferrule by pushing the fingertips into the seal and pulling back to dislodge the cap. A similar method requires a person to grab the outside surface of the cap and pull the entire cap away from the seal and ferrule.

The same tri-clamp connection technology is used in sanitary strainers and sanitary caps. Therefore, the sanitary tri-clamp cap connection inherently creates a tight seal that requires substantial force to break the seal from the gasket of the cap and the ferrule of the connection. Oftentimes, operators will be forced to use hand tools to remove the sanitary tri-clamp caps, such as discussed above using a flathead screwdriver, sharp object or hammer, with the possibility of damage and the requirement of to carry tools.

Consequently, there is currently no sanitary tri-clamp cap or sanitary strainer insert elements that have an integrated tool to apply additional mechanical force to remove the sanitary tri-clamp cap or insert strainer elements from ferrule or the strainer body without striking or prying the object itself.

SUMMARY OF THE INVENTION

Accordingly, a sanitary tri-clamp cap which reduces sanitation risks and down time for cost for food, beverage, cosmetics and pharmaceutical industries is provided.

Disclosed is a sanitary tri-clamp cap with integrated telescoping slide hammer. The product uses slide hammer technology. More specifically, the sanitary tri-clamp cap handle has a long metal shaft that is attached permanently to the sanitary tri-clamp cap, a heavy weight that can slide along the shaft, and a slide stop for the weight to impact on the end opposite of the attachment point. The impact force is thus transferred to the shaft, pulling the attached end in the direction the weight had been moving.

BRIEF DESCRIPTION OF THE DRAWINGS

FIG. 2 is a fragmentary cross section of the device of FIG. 1 in which the handle is in a first position in which the handle end wall is closer to the cap.

FIG. 3 is a fragmentary cross section of the device of FIG. 1 with the handle in a second position in which the handle end wall strikes the shaft stop block to thereby apply a force to the stop block and shaft which facilitates the separation of the cap from the body.

DESCRIPTION OF THE PREFERRED EMBODIMENTS

Figure 1:
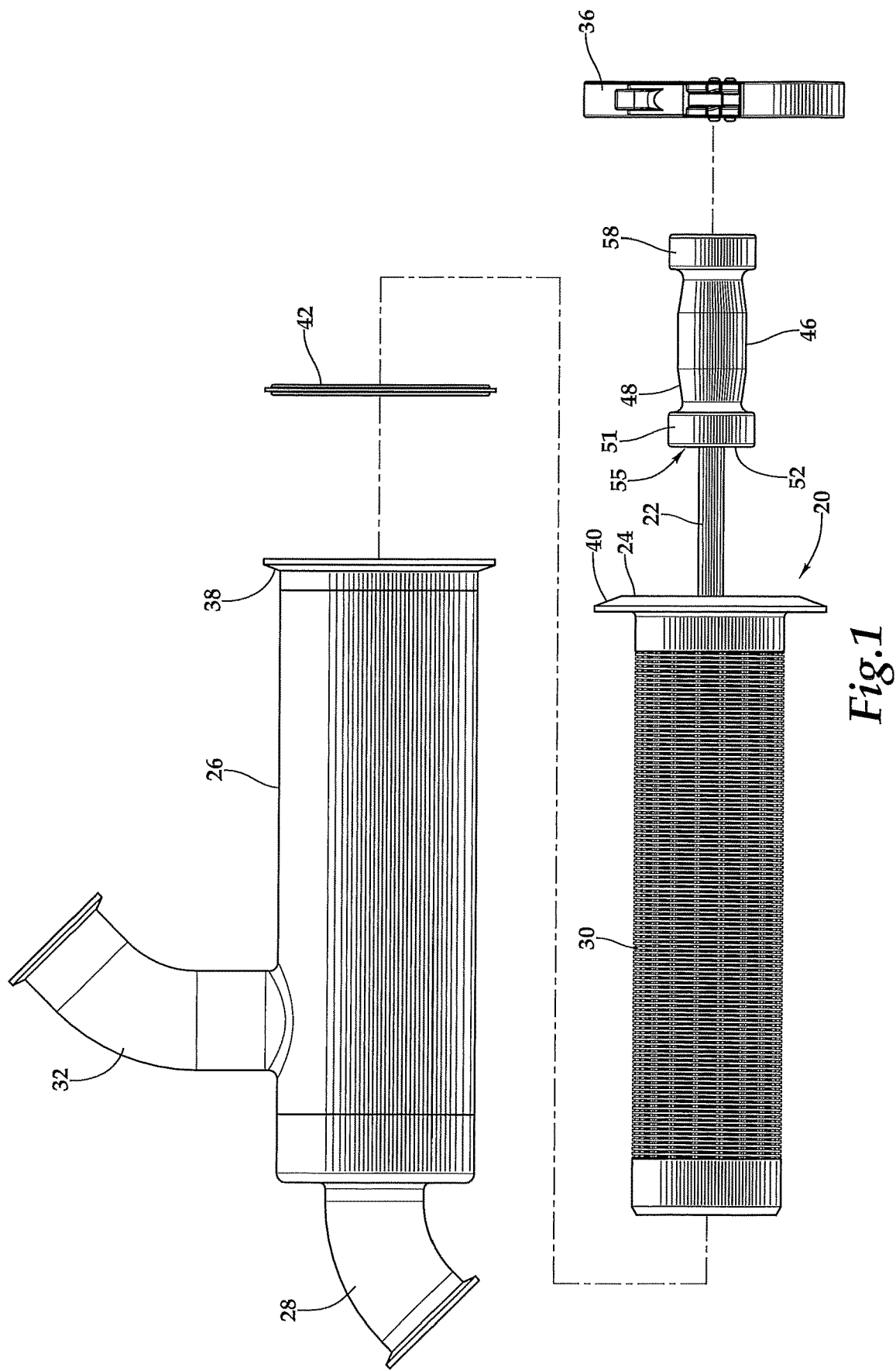
FIG. 1 an exploded side view of the sanitary tri-clamp cap with integrated telescoping slide hammer of this invention in connection with filter and hygienic fitting.

Referring to the FIGS. 1-5, wherein like numbers refer to similar parts, a sanitary tri-clamp cap with integrated telescoping slide hammer 20 which is shown in FIG. 1, and which facilitates removing sanitary tri-clamp caps and sanitary strainer insert elements. A cylindrical strainer body 26 is positioned to receive fluid in a food processing system which enters through an inlet 28. The fluid passes through a filter member 30 which is fixed to a rigid cap 24. After passing through the filter member 30, the fluid exits the strainer body 26 through an outlet 32. As shown in FIG. 2, the sanitary tri-clamp cap with integrated telescoping slide hammer 20 is releasably mounted to the strainer body 26 by a tri-clamp assembly 34 such as the TRI-CLOVER® hygienic fittings sold by Alfa Laval Corporate AB of Sweden. This clamping arrangement includes a releasable clamp 36 which engages a peripheral ferrule 38 extending from an open end of the strainer body 26 and a similar ferrule 40 formed on the cap 24. A flat annular gasket 42 is positioned between the strainer body ferrule 38 and the cap ferrule 40, such that a liquid tight seal is created when the clamp is secured. The sanitary tri-clamp cap with integrated telescoping slide hammer 20 has a metal shaft 22 which is permanently attached such as by welding directly to the sanitary tri-clamp cap 24, and which extends outwardly from the cap. The shaft 22 is of constant cross section and of a first diameter, and may be cylindrical and is terminated at its outward end by a rigid protrusion, stop block or stop 44 which extends radially outwardly from the shaft. The stop 44 has an interior contact surface 43 which faces towards the cap 24 and an exterior peripheral wall which extends axially and is located at the outside diameter of the stop. The shaft 22 is received within a handle 46 which serves as a heavy impact weight. The handle 46 has a generally cylindrical outer wall 48 and an interior cylindrical surface 47 which defines a central cylindrical interior volume through which the shaft 22 extends. The outer wall 48 may be formed with midpoint bulge to facilitate gripping by a user's hand.

Figure 4:
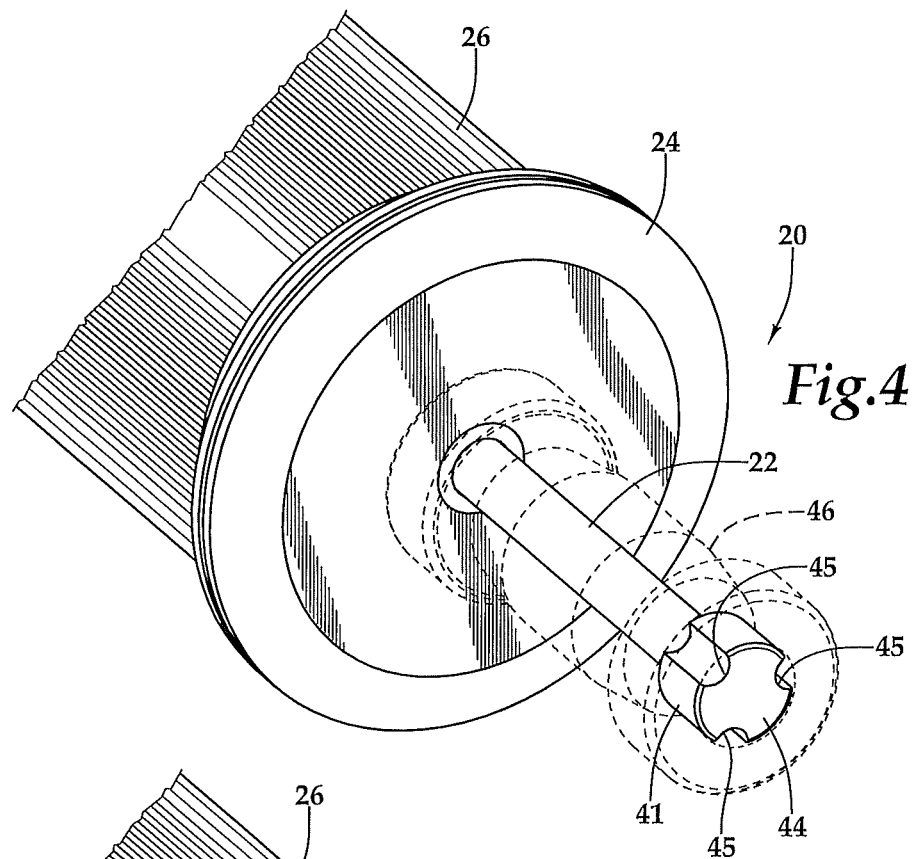
FIG. 4 is a fragmentary isometric view of the device of FIG. 1 with the slide hammer shown in phantom view.

As shown in FIG. 4, to facilitate cleaning of the sanitary tri-clamp cap with integrated telescoping slide hammer 20, the stop 44 on the shaft 22 is formed as a fluted cylinder of a second diameter thus defining a plurality of channels 45 which extend between the exterior 68 of the stop block and the interior volume 50 of the handle 46, thereby facilitating the exchange of cleaning fluid into and out of the tubular interior volume 50 of the handle. As shown in FIG. 2, the channels thus extend from an outwardmost portion 60 of the stop block to an inwardmost portion 62 of the stop block 44. Thus, when the device is used with a clean out of place (COP) system, such as a cabinet washer or an immersion tank cleaner, the cleaning fluid can be discharged onto the device and pass into and out of the handle.

The handle 46 has a base 51 which faces the cap 24. The handle base 51 has a cap end wall 52 which extends radially inwardly from the outer wall 48 and which terminates in a shaft opening 54 which is larger than the diameter of the shaft 22 but smaller than the diameter of the stop 44 on the shaft. The cap end wall has a cap facing surface 55 on the exterior of the base which faces the cap 24 and an impact surface 53 on the interior of the handle 46 which faces the stop 44. The shaft opening 54 communicates with an axially extending interior travel wall 49 which extends through the cap end wall 52 from the cap facing surface 55 to the annular impact surface 53, shown in FIG. 2. The impact surface 53 is located on the interior of the handle 46 which is located at the end of the interior volume 50 nearer the cap. The handle 46 has an outside end opening 56 opposite the end wall 52. The interior volume 50 extends from the base impact surface 53 to the outside end opening 56.

Figure 5:
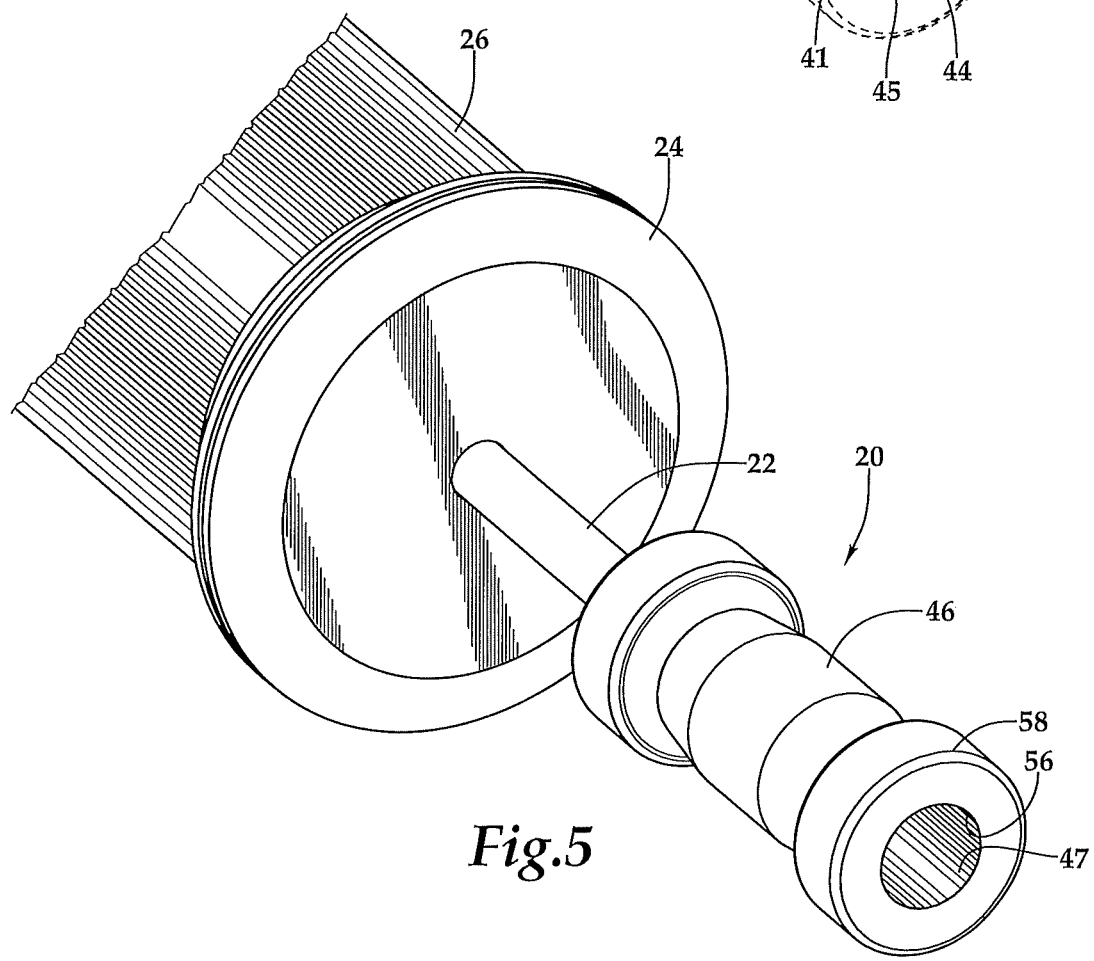
FIG. 5 is a fragmentary isometric view of the device of FIG. 1 with the slide hammer withdrawn and the clamp removed.

A flange 58 protrudes radially outward from the handle 46 beyond the outer wall 48 at the open end and provides an abutment for a user's grip when operating the slide hammer as discussed below. The handle 46 serves as a weight which is slidable along the shaft 22 away from the cap for controlled impact against the stop 44 as shown in FIGS. 2 and 5. The handle impact surface 53 of the base of the handle is configured to impact the interior contact surface 43 of the stop 44 internal of the handle. Because the stop 44 impacts the handle 46 within the handle, the user's hand is protected from pinching between the handle and the shaft during operation. Furthermore, because the handle impact surface 53 impacts the stop 44 on the shaft, the overall linear dimension requirements of the slide hammer mechanism is reduced, resulting in the need for a smaller space to install and operate the device. The shaft 22 does not need to be any longer than the handle 46. The installation dimension required to insert and remove the element is equal to the overall length of the insert assembly. Therefore, the length of the handle directly affects the overall required installation dimension. The length of the handle may be, for example, 5.38". The required operating dimension is 9.5". Compared to a common slide hammer installation, allowing the same hammer travel distance, might require 10.13" for installation and operation. It will be noted that the diameter of the shaft tubular interior volume 50 is generally greater than the diameter of the shaft. Thus the shaft axially extending travel wall 49 which extends from the shaft opening 54 in the cap end wall 52 of the handle engages the shaft 22 as the handle travels along the shaft, and the exterior peripheral wall 41 of the stop 44 engages the interior cylindrical surface 47 as it travels. These two engagements serve to guide the handle 46 in its travel along the shaft 22 and prevent binding between the two parts. The exterior peripheral wall 41 defines portions of a cylinder broken by channels 45. Thus the shaft interior volume 50 and the stop 44 are preferably generally cylindrical, although other shapes may be used so long as they mate with one another. The end cap, shaft and handle are preferably fabricated of stainless steel.

From time to time, when it is required to remove the strainer filter member 30 from the strainer body 26, the clamp 36 is removed as shown in FIGS. 3-5. The user then grips the heavyweight handle 46 and positions it on the shaft 22 adjacent the cap 24 of the assembly as shown in FIG. 4. The user then urges the handle 46 away from the cap, slamming it against the stop 44, as shown in FIGS. 3 and 5, driving the impact surface 53 of the handle base against the protruding stop 44. The impact force is thus transferred to the shaft 22, pulling the attached cap in the direction the weight had been moving and thus dislodging the tri-clamp cap 24 and all attached components such as the strainer insert element 30.

It should be noted that where space is not limited and pinch protection is not a concern, the device handle may be mounted on a shaft which extends beyond the handle in the retracted position a distance necessary to obtain the desired impact force.

It is understood that the invention is not limited to the particular construction and arrangement of parts herein illustrated and described, but embraces all such modified forms thereof as come within the scope of the following claims.

I claim:

1. A removable closure assembly for attachment to a filter assembly body with an opening therein, the closure assembly comprising:
   a cap which is configured for removable attachment to the filter assembly body to close the opening therein in a liquid-tight seal;
   a filter member fixed to the cap and extending upwardly therefrom;
   a shaft permanently fixed to the cap and extending downwardly therefrom, with the cap positioned between the filter member and the shaft, the shaft being terminated at an outer end thereof by a stop block which protrudes radially outwardly of the shaft, wherein the stop block comprises at least one axially extending channel therein which opens to an exterior of the removable closure assembly, the at least one axially extending channel for the passage of cleaning fluid therethrough; and a handle having a tubular outer wall, the handle being slidably positioned on the shaft and movable downwardly along the shaft, the handle having a handle base with an upper cap facing surface, and a lower impact surface which faces the stop block, wherein the handle base extends radially inwardly from the tubular outer wall, the handle base having a shaft opening therein, the shaft extending through the shaft opening, wherein the handle is movable between a first position in which the handle base is closer to the cap, and a second position in which the handle base strikes the shaft stop block to thereby apply a force to the stop block and shaft which facilitates the separation of the cap from the body.

2. An assembly including the removable closure assembly of claim 1 and further comprising:
a filter assembly body having an open end;
a body peripheral ferrule extending from the open end of the body;
a cap peripheral ferrule extending from the cap;
a gasket positioned between the body peripheral ferrule and the cap peripheral ferrule; and
a clamp engaging the body peripheral ferrule and the cap peripheral ferrule to define a liquid-tight seal between the cap and the body.

3. The removable closure assembly of claim 1 wherein when the handle is positioned abutting the cap, the shaft does not protrude axially beyond the handle.

4. The removable closure assembly of claim 1 wherein the handle has an open end opposite the handle base, and further comprising a flange which protrudes radially outward from the handle beyond the tubular outer wall at the open end, the flange providing an abutment for a user's grip when moving the handle against the stop block.

5. The removable closure assembly of claim 1 wherein the handle has portions defining an interior surface within the tubular outer wall of a diameter greater than a diameter of the shaft, and wherein a travel wall extending from the shaft opening in the handle base engages the shaft as the handle travels along the shaft, and wherein the stop block has an exterior diameter which engages the interior surface as it travels, thereby serving to guide the handle in its travel and prevent binding between the two parts.

6. The removable closure assembly of claim 5 wherein the handle interior surface is cylindrical, and wherein the stop block has an exterior peripheral wall defining portions of a cylinder.

7. The removable closure assembly of claim 1 wherein the tubular outer wall of the handle has portions defining a handle interior surface defining an interior volume and of a diameter greater than a diameter of the shaft, and wherein the stop block comprises a plurality of the axially extending channels which run along the stop block and communicate between the handle interior volume and the exterior, thereby facilitating the exchange of cleaning fluid into and out of the handle interior volume.

8. The removable closure assembly of claim 1 wherein the stop block is entirely positioned within the handle in the second position.

9. The removable closure assembly of claim 1 wherein the shaft is welded to the cap.

10. A filter assembly comprising:
a body with an opening therein;
a cap having a filter member extending upwardly therefrom, wherein the cap is removably fitted to the body to close the opening therein;
a shaft having a first end permanently fixed to the cap and extending downwardly from the cap to a second end, the shaft having a first diameter;
a stop block having a second diameter and fixed to the second end of the shaft, the stop block positioned on the shaft to extend radially outwardly of the shaft; and
a handle having a handle base with an upper cap, wherein an outer wall extends downwardly from the handle base, an interior surface which extends downwardly from the handle base on an interior of the handle, the interior surface defining an interior volume of the handle, wherein the handle base has a lower impact surface positioned within the interior of the handle, and wherein the handle is positioned such that the shaft extends through a shaft opening in the handle base and through the handle interior volume, the handle being slidably positioned on the shaft and movable downwardly along the shaft, wherein the interior surface has a third diameter which is greater than the first diameter of the shaft and the second diameter of the stop block, wherein the stop block has portions defining at least one axially extending channel which runs between an outwardmost portion of the stop block which communicates with an exterior of the filter assembly and an inwardmost portion of the stop block, thereby facilitating the exchange of cleaning fluid from the exterior of the filter assembly into and out of the interior volume of the handle; and
wherein the handle is movable between a first position in which the handle base is closer to the cap, and a second position in which the handle base strikes the shaft stop block to thereby apply a force to the stop block and shaft which facilitates the separation of the cap from the body.

11. The filter assembly of claim 10 wherein the shaft opening in the handle base opens on an axially extending travel wall which communicates with the interior of the handle, and wherein the axially extending travel wall engages the shaft as the handle travels along the shaft, and wherein the stop block engages the handle interior surface as the handle travels from the first position to the second position, thereby serving to guide the handle in its travel and prevent binding between the two parts.

12. The filter assembly of claim 10 wherein the handle interior surface is cylindrical and the stop block has an exterior peripheral wall defining portions of a cylinder which engage the handle interior.

13. The filter assembly of claim 10 wherein the stop block is entirely positioned within the handle in the second position.

14. The removable closure assembly of claim 10 wherein the shaft is welded to the cap.

15. A removable closure assembly for a filter assembly having a body with an opening therein which receives a filter member and for use within a cleaning system exterior to the removable closure assembly configured for discharging cleaning fluid towards the closure assembly, the closure assembly comprising:
a cap configured to be removably fitted to the filter assembly to close the opening therein;
a filter member extending upwardly from the cap;
a shaft having a first end permanently fixed to and extending downwardly from the cap to a second end;
a stop block fixed to the second end of the shaft, the stop block positioned on the shaft to extend radially outwardly of the shaft and having at least one axially extending channel which extends from an outwardmost portion of the stop block to an inwardmost portion of the stop block; and a handle having a handle base with an upper cap facing surface, wherein an outer wall extends downwardly from the handle base, an interior surface which extends downwardly from the handle base on an interior of the handle, the interior surface defining an interior volume of the handle, wherein the handle base has a lower impact surface positioned within the interior of the handle, and wherein the handle is positioned such that the shaft extends through a shaft opening in the handle base of the handle and through the handle interior volume, the handle being slidably positioned on the shaft and movable downwardly along the shaft; and wherein the handle is movable between a first position in which the handle base is closer to the cap, and a second position in which the handle base strikes the shaft stop block to thereby apply a force to the stop block and shaft which facilitates the separation of the cap from the body, and wherein the stop block at least one axially extending channel extends along the stop block to communicate between an exterior of the handle and the interior volume of the handle, thereby facilitating the exchange of cleaning fluid discharged by the cleaning system into and out of the interior volume of the handle.

16. The closure assembly of claim 15 wherein the stop block has a plurality of the axially extending channels formed therein for the introduction of cleaning fluid into the interior volume of the handle.

17. The closure assembly of claim 15 wherein the shaft opening in the handle base communicates with a cylindrical travel wall which passes through the handle base, and wherein the stop block has an exterior peripheral wall defining portions of a cylinder.

18. The closure assembly of claim 15 wherein the stop block is entirely positioned within the handle in the second position.

19. The removable closure assembly of claim 15 wherein the shaft is welded to the cap.

* * * * *

UNITED STATES PATENT AND TRADEMARK OFFICE
CERTIFICATE OF CORRECTION

| | | |
|---|---|---|
| PATENT NO. | : 12,286,283 B2 | Page 1 of 1 |
| APPLICATION NO. | : 18/125786 | |
| DATED | : April 29, 2025 | |
| INVENTOR(S) | : Timothy D. Reuter | |

It is certified that error appears in the above-identified patent and that said Letters Patent is hereby corrected as shown below:

In the Specification

Column 5, Line 21, "cylindrical interior volume through which" should be --cylindrical interior volume 50 through which--.

In the Claims

Column 8, Line 7, "with an upper cap, wherein" should be --with an upper cap facing surface, wherein--.

Column 8, Line 48, "which engage the handle interior" should be --which engage the handle interior surface--.

Signed and Sealed this
Fifteenth Day of July, 2025

Coke Morgan Stewart
*Acting Director of the United States Patent and Trademark Office*